UNITED STATES PATENT OFFICE.

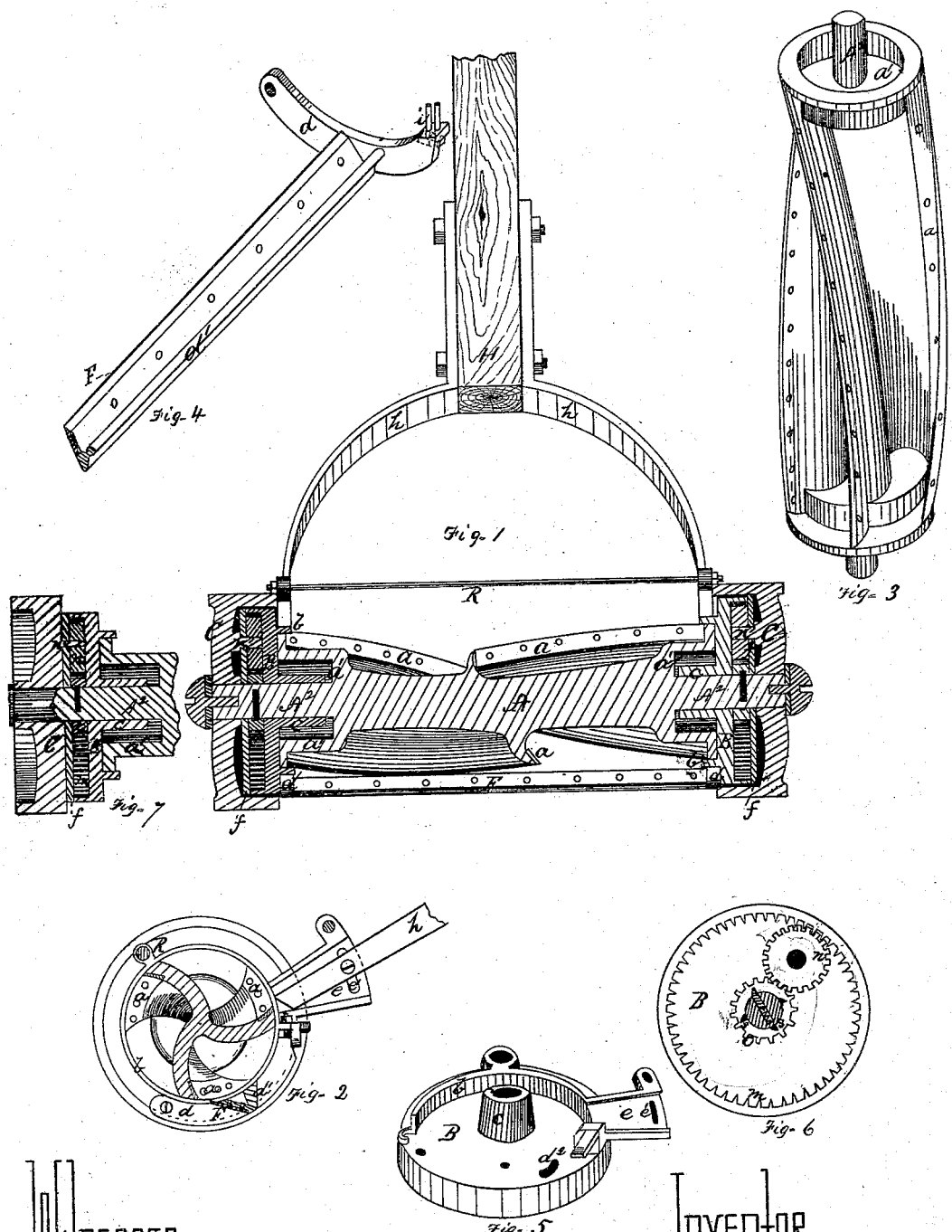

JOHN CALVIN STURGEON AND CARSON JAY STURGEON, OF ERIE, PA.

IMPROVEMENT IN LAWN-MOWERS.

Specification forming part of Letters Patent No. 178,032, dated May 30, 1876; application filed May 21, 1875.

*To all whom it may concern:*

Be it known that we, JOHN C. STURGEON and CARSON J. STURGEON, of Erie, in the county of Erie and State of Pennsylvania, have invented a new and useful Improvement in Lawn-Mowers; and we do hereby declare the following to be a full, clear, and exact description thereof, reference being had to the accompanying drawing, forming a part of this specification, in which—

Figure 1 is a longitudinal section of a lawn-mower embodying our improvements. Fig. 2 is a transverse section of the cutters, showing the relation of the same to the gear-box and the manner of securing and adjusting the fixed or straight cutter. Fig. 3 is a perspective view of the revolving cutter. Fig. 4 is a similar view of the fixed cutter and the arms for attaching and adjusting it. Fig. 5 is a perspective view of that side of the gear-box next the cutters. Fig. 6 is a view of that side of the gear-box next the driving-wheel, the covering-cap being removed to show the gearing. Fig. 7 is a modification.

Like letters refer to like parts wherever they occur.

Our invention relates to that class of devices generally known as "lawn-mowers," wherein a rotary and fixed cutter are employed; and it consists, first, in forming the revolving cutter with cupped or countersunk ends, which surround and protect the bearings of the cutter from the grass, dust, &c.; second, in combining, with pivoted arms or levers for supporting a fixed cutter, a cutter-blade, mounted obliquely to the local proximate plane of the arms, so that the cutter may be lifted relatively to its plane while being swung, whereby the edge of the fixed cutter is preserved; third, in providing sleeve-boxes or journals, which inclose the shaft of the rotary cutter in such a manner as to prevent the winding of grass or other material about said shaft; and, finally, in details of construction, hereinafter more specifically set forth.

In order that others skilled in the art may apply our improvements, we will now proceed to describe the same, referring to the accompanying drawings, in which—

A indicates the revolving cutter, provided with the spiral blades $a\ a$, secured by bolts and nuts, or in other approved manner. The ends of cutter A are cupped or countersunk, as at $a'$, so as to project over and protect the cutter-shaft, which, in this instance, is formed in one piece with the revolving cutter. The shaft $A^2$ of cutter A passes loosely at each end through gear-boxes B, which inclose the driving-gears, and to the outside of which are the driving-wheels C C, which also revolve loosely on the shaft $A^2$. B B are gear-boxes, which may form the ends of the frame within which the cutter A revolves, and when so employed are formed upon the sides next the cutter, with ribs or flanges $b\ b$ extending for one-half or two-thirds the circumference of the revolving cutters, the ends of which are inclosed thereby, the remainder of the circles being formed by the curved pivoted arms, which carry the fixed cutter. $c\ c$ are sleeve-boxes, formed upon B B, through which the ends of shaft $A^2$ pass, said sleeve-boxes encompassing the shaft within the cupped ends $a'$ of the cutter, incasing the shaft in such a manner as to protect it from the grass, which might otherwise wind around the shaft and obstruct its movement. $e\ e$ are projecting sector-shaped plates, which may be cast with, or secured to, the inner sides of the gear-box, to give attachment for the handle H $h\ h$, and are slotted, as at $e'$, to permit of the adjustment of the handle, which may be secured by bolts, thumb-screws, or in other suitable manner. Pivoted to the inner sides of the gear-boxes B B, and completing the circular flanges $b\ b$, which inclose the ends of the revolving cutter, are curved arms $d$, united by a cross-bar, $d^1$, to which (or to the arms, if the cross-bar is dispensed with) the fixed cutter F is secured. The rear sides of the arms $d$ are provided with pins or bolts, which move in slots $d^2$, formed in the gear box or frame, and the ends of the arm may work under lugs projecting downward from the sector-plates $e\ e$, the arms $d\ d$ being raised or lowered to regulate the cut by means of set-screws $i$, which bear against an appropriate portion of the frame.

It will thus be seen that the gear-boxes, the cutter-arms, and cross-bar for the fixed cutter, together with one or two cross rods, R R, to strengthen and preserve the relation of the several parts, form a strong and compact frame for the operative parts of the machine.

We will next proceed to describe the driving-gear, again referring to the gear-boxes B B, which have heretofore been considered only in relation to the main frame, and as constructed to form portions of said frame, the following description contemplating them as independent cases for inclosing the gearing which actuates the revolving cutter.

Within the gear-boxes B B are the fixed internal toothed spur-gears $m$, meshing with loose pinions $n$, which in turn mesh with the central spur-pinions $o$ upon the shaft of the revolving cutter. The pinions $o$ are loose upon shaft $A^2$, but provided with notches $s$, into which spring-pawls on or in the shaft $A^2$ take when the machine is moved forward. These gear-boxes B are covered by loose caps $f$, which protect the gearing, and through which pass the shafts $n'$ of the loose pinions $n$, said shafts being secured to spokes or other portions of the driving and carrying wheels, which are secured loosely upon the shaft to the outside of the gear-boxes. C C are the carrying and driving wheels, and as they are the only portions of the apparatus which rest upon the ground, and are consequently required to carry the entire weight of the machine, they should have a wide tread, which may be formed and space economized by making the diameter of the gear-boxes such that they will fit within the rim of the wheels.

In using the apparatus, the operator pushes the machine before him by means of the handle, the rotation of the wheels I transmitting the power, through pinions $n$ $o$, to the shaft of the rotary cutter, which is caused to move with pinion $o$ by the pawl and ratchet $s$. The rotary cutters working against the stationary cutter shears off the grass. When the machine is drawn backward, the pawls and ratchet permit the pinions $o$ to rotate independent of the shaft $A^2$, and the rotary cutters consequently receive no power.

The advantages of our devices are, that the hollow cup-ended rotary cutter protects the bearings and gearing against the entrance of dust and dirt, and prevents the winding of grass or other substance around the shaft. The sleeve-journal will also protect the shaft from being obstructed by grass when the rotary cutter is simply cut away, and when used together with the hollow cup is a double guard against the entrance of dust, &c. The pivoted arms for carrying the fixed cutter facilitate and simplify its adjustment.

Having thus described the nature of our invention, the manner of applying, and the benefits to be derived therefrom, what we claim, and desire to secure by Letters Patent, is—

1. A rotary cutter for lawn-mowers and similar machines having cupped or countersunk ends, substantially as and for the purpose specified.

2. In combination with a rotary cutter recessed at the ends, a sleeve or sleeves, incasing and protecting the shaft of the cutter within the recess or recesses, substantially as specified.

3. In combination with pivoted arms or levers for supporting a fixed cutter, the cutter-blade mounted obliquely to the local proximate plane of the arms, and adjusting devices suitably arranged, whereby the cutter is adapted to be lifted relatively to its plane while being swung, substantially as described.

4. The combination of a hollow cup-ended cutter, gear-boxes, provided with sleeves, which incase the shaft of the rotary cutter, and a fixed cutter pivoted to the gear-boxes, substantially as and for the purpose specified.

In testimony whereof we, the said JOHN C. STURGEON and CARSON J. STURGEON, have hereunto set our hands.

JOHN CALVIN STURGEON.
CARSON J. STURGEON.

Witnesses:
PAUL H. GAITHER,
MYRON E. DUNLOP.